Nov. 3, 1925.  1,560,187
J. G. NAYLOR
SMOKE CONSUMER AND FUEL ECONOMIZER
Filed Oct. 21, 1922  6 Sheets-Sheet 1

Inventor
J. G. Naylor
per.
Langner, Parry, Card & Langner
Att'ys

Nov. 3, 1925.  1,560,187

J. G. NAYLOR

SMOKE CONSUMER AND FUEL ECONOMIZER

Filed Oct. 11, 1922   6 Sheets-Sheet 2

Inventor
J. G. Naylor
per
Langner, Parry, Card & Langner
Att'ys

Nov. 3, 1925.
J. G. NAYLOR
1,560,187
SMOKE CONSUMER AND FUEL ECONOMIZER
Filed Oct. 11, 1922   6 Sheets-Sheet 4
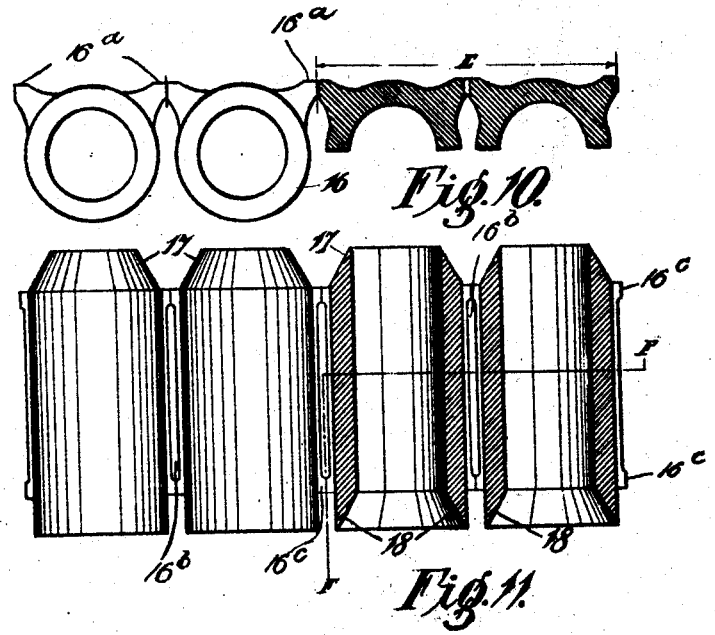
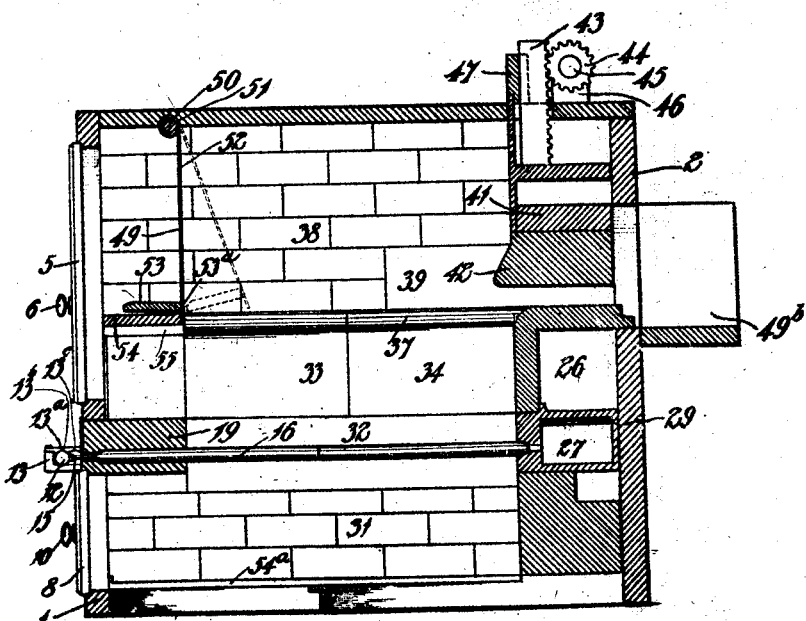
Inventor
J. G. Naylor
per
Langner, Parry, Card & Langner
Att'ys.

Nov. 3, 1925. 1,560,187
J. G. NAYLOR
SMOKE CONSUMER AND FUEL ECONOMIZER
Filed Oct. 11, 1922 6 Sheets-Sheet 5

Inventor
J. G. Naylor
per
Langner, Parry, Card & Langner
Att'ys.

Nov. 3, 1925. 1,560,187
J. G. NAYLOR
SMOKE CONSUMER AND FUEL ECONOMIZER
Filed Oct. 11, 1922 6 Sheets-Sheet 6
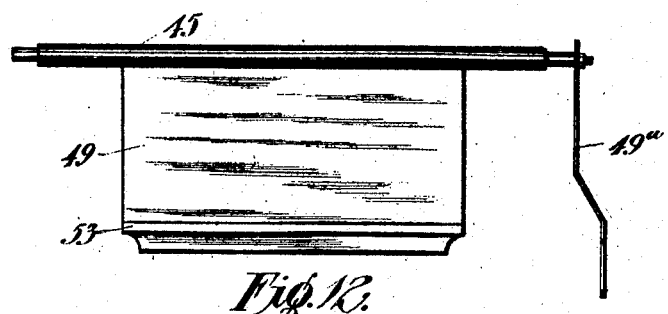
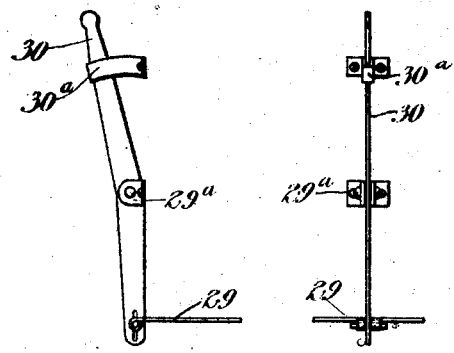
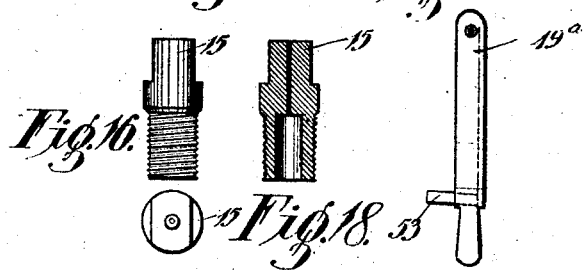
Inventor
J. G. Naylor
per
Langner, Parry, Card & Langner
Atty's.

Patented Nov. 3, 1925.

1,560,187

UNITED STATES PATENT OFFICE.

JOSHUA GOODALL NAYLOR, OF HAWTHORN, NEAR MELBOURNE, VICTORIA, AUSTRALIA.

SMOKE CONSUMER AND FUEL ECONOMIZER.

Application filed October 11, 1922. Serial No. 593,816.

*To all whom it may concern:*

Be it known that JOSHUA GOODALL NAYLOR, a citizen of the Commonwealth of Australia, and resident of Hawthorn, near Melbourne, in the State of Victoria, Commonwealth of Australia, has invented a certain new and useful Smoke Consumer and Fuel Economizer, of which the following is a specification.

This invention relates to a smoke consumer and fuel economizer and means combined therewith for controlling and drawing off gas and has been devised in order to provide an apparatus which is capable of developing a maximum of power from the fuel used, irrespective of the kind of fuel used.

One of the main characteristics of the invention resides in the fact that the whole apparatus is an external unit, adapted to be placed adjacent boilers or the like in a very short space of time and enabling the operator to generate steam or heat according to requirements, the apparatus being such that it can be quickly attached to or detached from a boiler or the like. This is a great advantage over internally positioned smoke consumers as heretofore known.

The present invention has been devised in order to provide mechanism of greater utility and efficiency than those at present in use.

Also the known means for consuming smoke and economizing in the use of fuel have to be built into the plants at the time of erection, or otherwise the foundation has to be partly removed in order to provide an existing power generating plant with smoke consuming and fuel economizing apparatus.

The existing means are not economical in so far as fuel is concerned, for the reason that heat is wasted owing to their construction.

In this invention water is passed in a fine jet into specially constructed hollow fire bars to turn the water into gas, which is then mixed with gases thrown off from the fuel and taken from the atmosphere, the mixture of the gases becoming homogeneous and passing through passageways which are heated by the furnace, so that an intense heat is obtained, sufficient to melt platinum.

The essential characteristics of the invention are substantially as follows:

1. The provision of apparatus adapted to be placed adjacent and externally of boilers or other forms of steam generators, the apparatus being adapted to be placed near to or distant from the boilers.

2. Means whereby atmospheric gases are intensely heated preparatory to the entry of said gases into the flame in the fire box.

3. The provision of hollow fire bars which are disposed longitudinally of the apparatus and adapted to increase the heating power of the flame for power generating purposes.

4. The provision of a damper in the front of the apparatus adapted to regulate the burning of the fuel.

5. A hopper arranged above and removably secured to the apparatus for the reception of fuel.

6. An adjustable wall pivotally mounted to the top of the apparatus and extending down to a wall of fire brick or other heat resisting material, the adjustable wall being adapted to regulate the supply of fuel to the furnace proper, which is particularly advantageous when different grades of fuel are used to generate heat, the wall being adjusted to prevent the fuel being fed too freely to the flame.

7. The provision of a tunnel at the rear of the apparatus and interconnecting the fire bars the tunnel being adapted to receive gas generated in the fire bars from jets of water playing therein, the jets being arranged along a common feed-pipe and each nozzle corresponding with the mouth of a fire bar.

8. A regulating shutter arranged in the tunnel above referred to and operable externally of the apparatus for regulating the flow of hydrogen gas to the furnace, by means of an opening in the tunnel, which when open allows of free communication with a main tunnel which is disposed at the rear and along each side of the apparatus and above the tunnel provided with the regulating shutter.

9. The provision of a bridge block having a fire brick or plumbago lip, the bridge block being capable of adjustment by means of racks provided on a frame to which the lip is secured, the racks engaging toothed pinions mounted on a shaft disposed on the top of the apparatus the one end of the shaft having a downwardly disposed arm for raising or lowering the bridge block for altering and regulating the density of the flame which is adapted to pass through at the rear of the apparatus into a heat resisting guiding tunnel for conveying the flame produced in the tunnel to the boilers or other power generators.

10. Means for conducting the gas formed from the water, through a tunnel arranged above the tunnel interconnecting the hollow fire bars, so that the gas combined with nitrogen, oxygen and carbon may be returned into the fire box or furnace for augmenting the heating elements and also for lessening the consumption of solid fuel thus relatively increasing the generative power of the plant.

For purposes of illustration and convenience of description I will describe a smoke consumer and fuel economizer for use with boilers but I desire it to be understood that it may be equally successful when used with any power or heat generating devices.

In order to be more readily understood the invention will now be described with reference to the accompanying drawings in which:—

Figure 7 is a vertical longitudinal central section on the line C C of Figure 2.

Figure 10 is a front elevation of the preferred form of fire bars for use with this invention, the two sections marked E being a transverse section on line F F of Figure 11.

Figure 11 is a plan view of the preferred form of fire bar with the two right hand bars in section.

Figure 12 is a front elevation of the adjustable wall for use with this invention.

Figure 13 is an end elevation thereof.

Figure 14 is a side elevation of the shutter and operating arm for use in the gas tunnel.

Figure 15 is a front elevation thereof.

Figure 16 is a front elevation of the preferred form of nozzle for spraying the water into the hollow fire bars.

Figure 17 is a plan view thereof and

Figure 18 is a vertical central section thereof.

Figure 1:
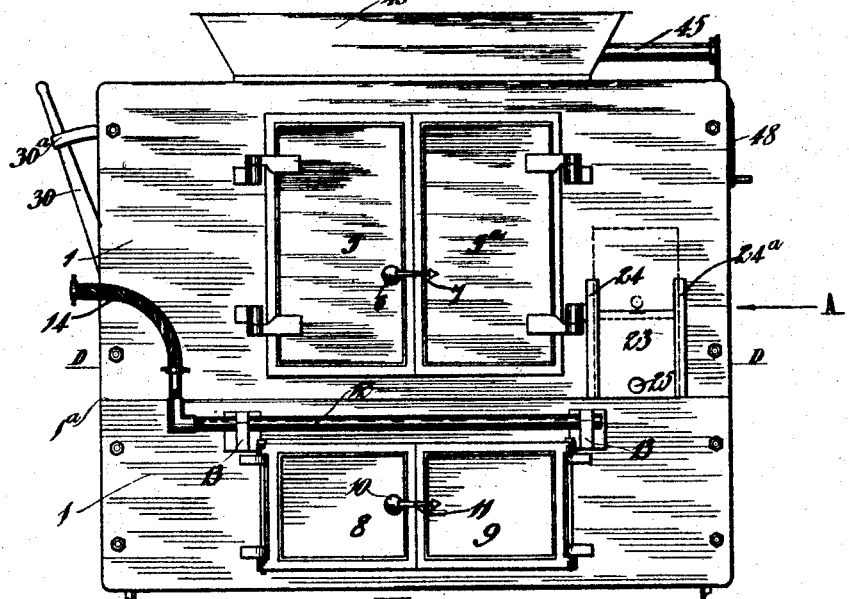
Figure 1 is a front elevation of the apparatus constructed according to my invention.

According to this invention an outer metal casing is provided and composed of a front plate 1, a rear plate 2 and side plates 3 and 4, which are provided with flanges $3^a$ and $3^b$ and $4^a$ and $4^b$ respectively in order to provide a means for securing the front plate 1 and rear plate 2 thereto.

The side plates 3 and 4 are provided with transport means in the form of flanged wheels $4^c$ which are pivotally mounted to the side plates 3 and 4, the object of the wheels $4^c$ being to provide means for movement to or from the boiler, rails being preferably provided on suitable sleepers placed on the ground.

The front plate 1 is preferably divided at $1^a$ in order to allow of more rapid inspections and also to allow the lower portion being removed should occasion arise.

The upper portion of the front plate 1 is provided with doors 5 and $5^a$ which are hinged to the front plate 1, a knob 6 being secured to one door and a closing handle 7 secured to the other.

On the lower portion of the front plate 1 are doors 8 and 9 which are hinged in any suitable manner, the one door being provided with a knob 10 and the other door with a closing handle 11.

The object of the upper doors 5 and $5^a$ is to allow of free access to the internal construction of the apparatus and that of the lower doors 8 and 9 for removing any ash deposit from the fire box, and when the doors are closed they fit substantially air tight.

Arranged on the front plate 1 is a pipe line 12 supported in brackets 13 secured to the front plate in any suitable way, the pipe line 12 being connected to any suitable source of water supply by means of a flexible connection 14.

Disposed along the inner side of the pipe 12 is a plurality of nozzles 15 corresponding with the number of fire bars 16 in the fire box.

These fire bars 16 are of special construction the preferred form being more particularly illustrated in Figures 10 and 11 of the drawings.

The fire bars 16 are hollow with a tapered male end 17 and female end 18, the end 17 being adapted to pass into a front supporting member 19 which slides into grooves 20 and $20^a$ provided on depending lugs 21 and 22 cast integral with the side plates 3 and 4.

The object of the female end 18 on the fire bars is to allow the male end of a second section to engage therein and thus form a continuous fire bar.

The fire bars at the rear of the portions of the fire box or furnace being subjected to the greatest heat, it becomes necessary to replace these more often than the front portions so by making them in two separable portions the rear portion thereof may be replaced without replacing the whole bar.

On the one side of the front plate 1 is a damper 23 moving in guides 24 and 24$^a$, the damper having an orifice 25 therein so that when the damper 23 is closed sufficient atmosphere will be admitted in order to keep the fire burning although low.

This damper is in direct communication with a tunnel 26 disposed at the rear and continuing on both sides and leading into the fire box.

Below this tunnel 26 is a short tunnel 27 the length of which is substantially equal to the width of the apparatus, provided in its upper wall with an opening 28 adapted to be closed or opened by a shutter 29 operated by an arm 30, which is pivotally mounted at 29$^a$ to one side of the casing, the upper end of the operating arm 30 moving in a guide 30$^a$ secured to the plate 4.

The short tunnel 27 is in direct communication with the fire bars 16, and when the gas generated by the water being sprayed into the fire bars travels along the bars, it flows into the tunnel 27 and is held therein until released by operating the shutter 29 which allows the gas to pass along the tunnel 26 which is heated to a maximum temperature so that the gas is highly rarified and rendered highly expensive, or alternatively this gas may wholly or partly be withdrawn for immediate use.

The internal construction of the apparatus, mainly the fire box, may be constructed of ordinary brick work 31 up to a convenient height below the fire bars 16, when it becomes necessary to use fire bricks 32, 33, 34, 35 and 36 as the heat is too great at these points for the use of any material other than that which is capable of withstanding intense heat.

The fire bricks 33, 34, 35 and 36 are preferably formed with a chamfer 37 in order to deflect the heat and cause its concentration at desired points, the chamfer 37 also preventing the fuel from becoming lodged and remaining inactive, since the fuel as fed into the fire box from the furnace cannot rest upon the corners of the fire bricks.

The chamfer 37 also protects the brick work 38 above the fire bricks from damage due to overheating and where the heat is most intense a fire brick 39 is placed so that the damage to the walls of the apparatus is minimized to a great degree.

The fire bricks are rabbeted as at 40 to prevent them from falling when placed, and also to make a tight joint and thereby reduce the risk of loss of heat to a minimum.

Disposed at the rear of the apparatus is a bridge block 41 to which is secured a fire brick or plumbago lip 42 the object of which is to regulate the exit of flame from the fire box by raising or lowering the bridge block 41 and lip 42, by means of racks 43 and 43$^a$ secured to the bridge block 41 in any suitable way.

The racks 43 and 43$^a$ mesh with toothed pinions 44 and 44$^a$ mounted on a shaft 45 supported in bearings 46 and 46$^a$ secured to the top of the casing.

The racks 43 and 43$^a$ move in a guide 47 secured to the casing.

On the end of the shaft 45 is an operating arm 48 which when moved to the right or the left raises or lowers the bridge block 41 and lip 42 according to requirement so as to adjust the density of flame as it leaves the fire box.

Figure 2:
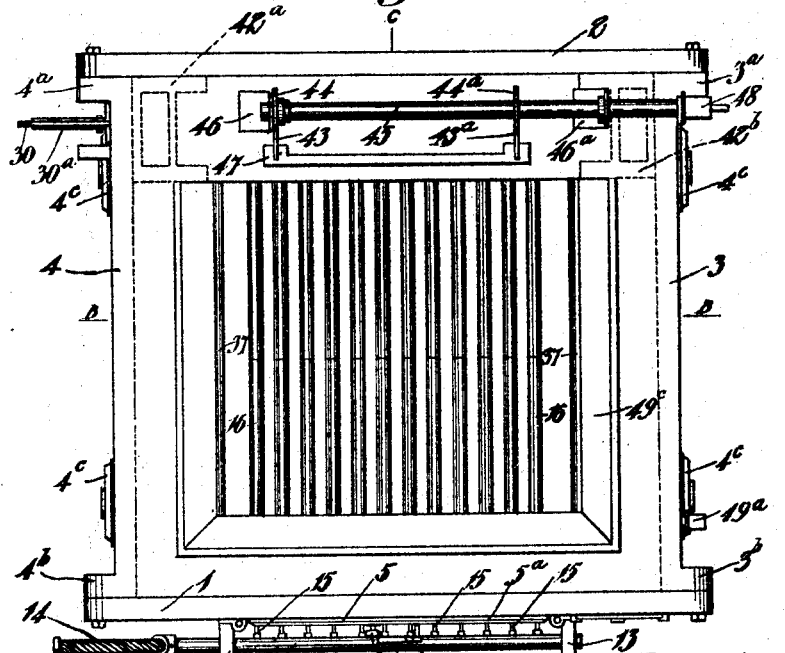
Figure 2 is a plan view thereof.

The bridge block 41 together with its lip 42 moves in guides 42$^a$ and 42$^b$ as shown in dotted lines, Figure 2, which are bolted to the sides 3 and 4.

These guides 42$^a$ and 42$^b$ insure an even movement of the bridge block in its being raised or lowered.

In order to regulate the feeding of fuel into the fire box, a pivotally mounted flap 49 is provided composed of a circular shaft 50 having a flat 51 thereon so that a metal sheet 52 forming flap 49 can be secured thereto in any suitable way.

The lower end of flap 49 is provided with a lip or flange member 53 secured above the lower edges 53$^a$ of the flap 49 so that when the flap is moved forwardly by a lever 49$^a$ the member 53 tends to keep any draught away from the fire box should the doors 5 and 5$^a$ be opened, the member 53 keeping in fairly close contact with a protecting plate 54 resting on shoulders 55 provided within the casing.

Below the fire bars 16 is a sheet iron plate 54$^a$ adapted to be withdrawn from the casing for removing any ash deposit that may result.

Figure 3:
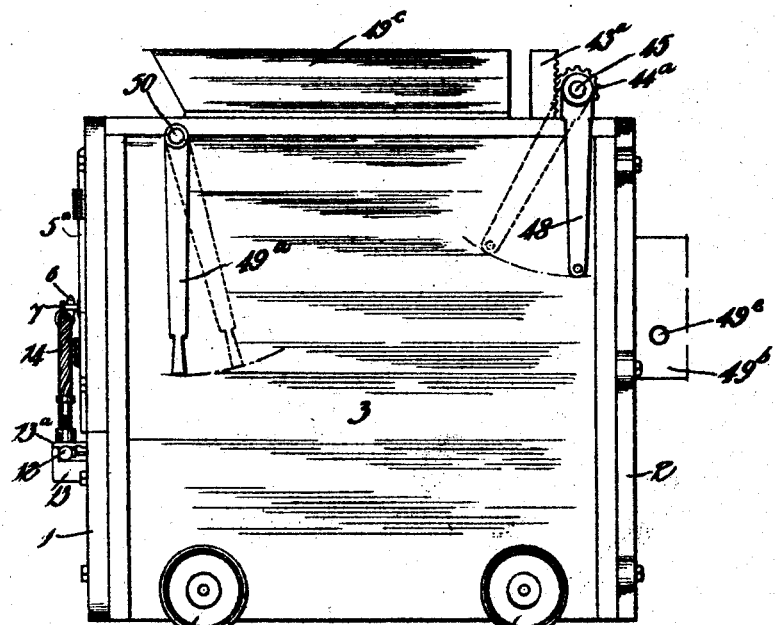
Figure 3 is a side elevation thereof looking along arrow A.
Figure 4:
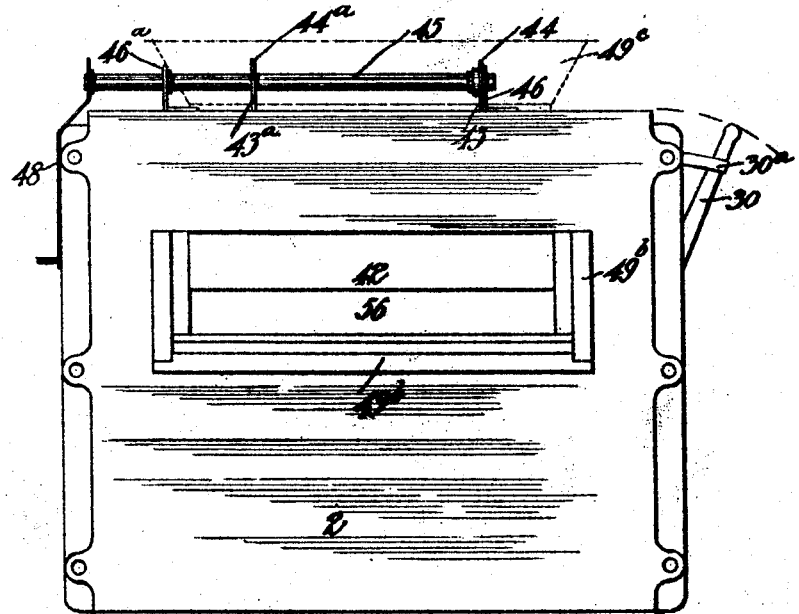
Figure 4 is a rear elevation thereof.
Figure 5:
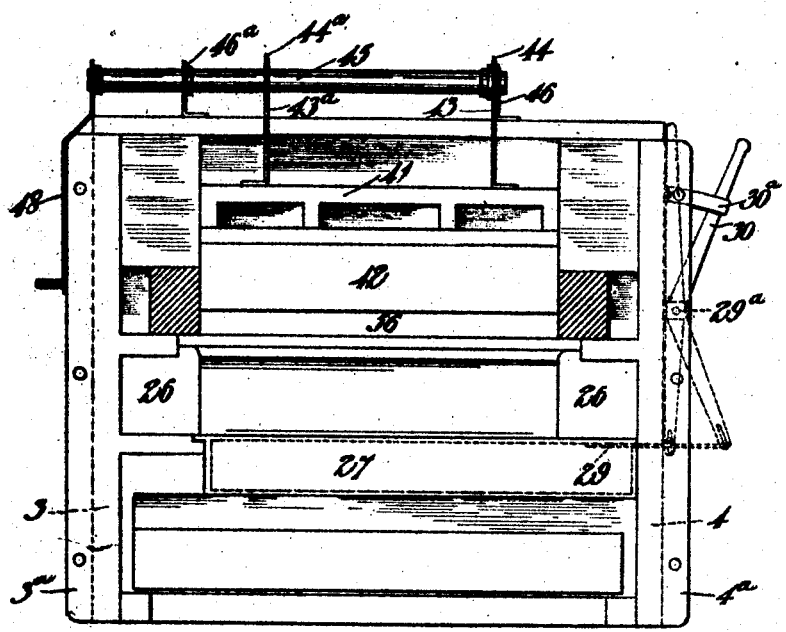
Figure 5 is a rear elevation of the apparatus with the back plate removed.
Figure 6:
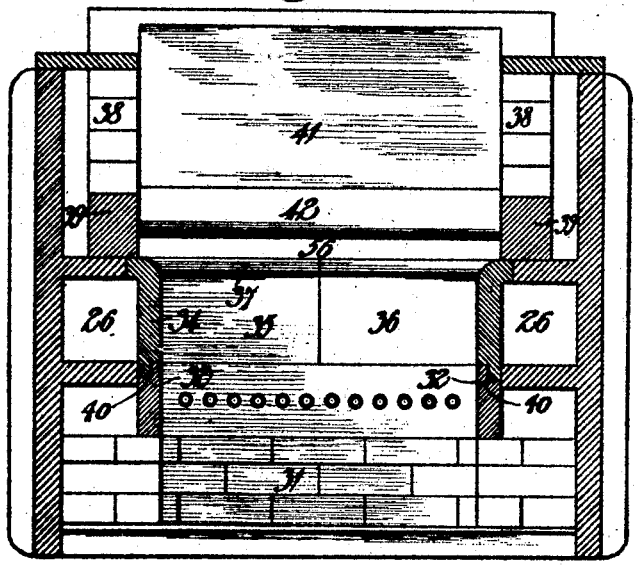
Figure 6 is a vertical transverse section on the line B B of Figure 2.
Figure 8:
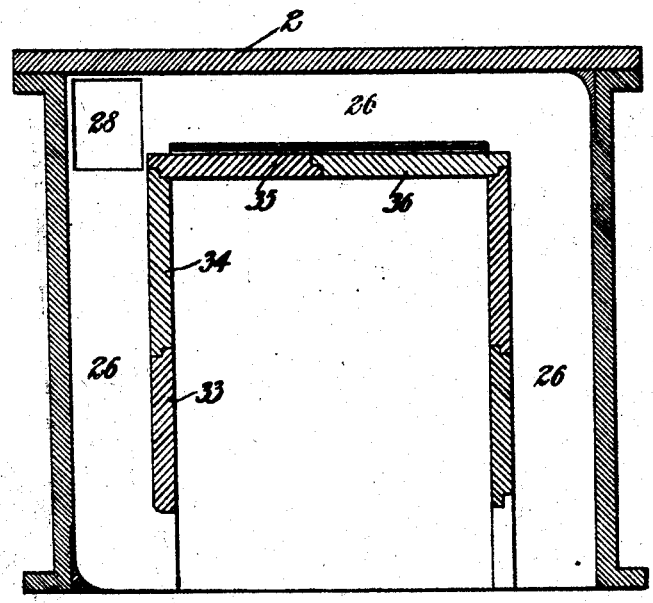
Figure 8 is a horizontal section with the front plate removed on the line D D of Figure 1 and showing the gas tunnel.
Figure 9:
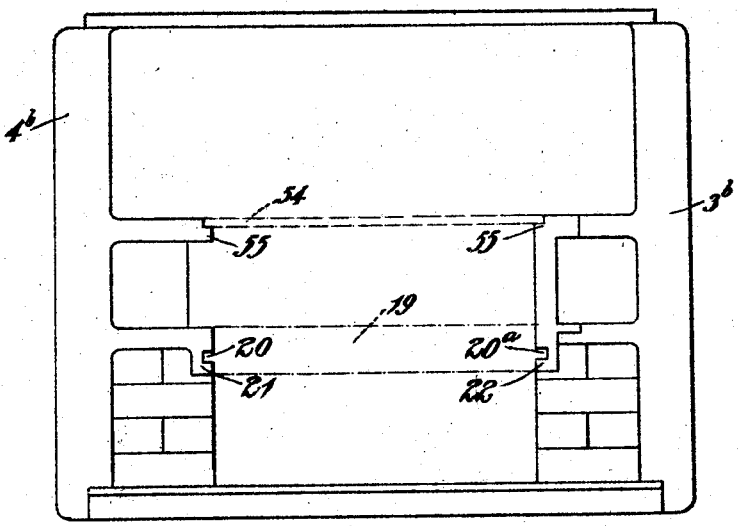
Figure 9 is an elevation with front plate removed showing the preferred form of casting to receive the front support of the fire bars.

For ordinary heating purposes the water supply pipe 12 is placed as shown in Figures 1, 2 and 3 of the drawings, the pipe being held and supported in brackets 13 provided each with a cap 13$^a$ which has grooves 13$^b$ and 13$^c$ formed therein to conform with the diameter of the pipe 12 as shown in Fig. 7.

In the position illustrated the pipe 12 is spaced from the front plate 1 so that when the apparatus is in use a certain amount of nitrogen and oxygen of the atmosphere is admitted with the water into the fire bars 16 the gas product generated therein being used mainly for increasing the heating and assisting in the combustion of the solid fuel. But if it is desired to attain a different result, the water supply pipe 12 is placed in the grooves 13ᶜ which brings the said pipe directly against the front plate 1, causing the nozzles 15 to enter the fire bars 16 in such a manner that all air is excluded, and the gas then generated from the water alone playing on the internal walls of the hollow fire bars is conveyed directly into the tunnel 27, from which the gas may be drawn for any purpose where desired.

By adjusting the flap 49 various grades of fuel may be used, this flap 49 being particularly useful when different forms of fuel are used for heating purposes, the large pieces being deposited into the fire box by means of the hopper 49ᵃ so that by adjusting the flap 49 the lumps may be lowered uniformly on to the fire bars 16, also should the fuel become sluggish or tend to clog above the fire bars 16 the flap 49 may be moved in order to overcome any congestion within the hopper 49ᵃ.

The flame after leaving the fire box is directed to the boiler by passing along a fire brick guide or tunnel 49ᵇ disposed at the rear of the casing, and the guide may be provided with a spy hole 49ᵉ composed of mica. This guide may be of any suitable length, such length depending upon existing conditions, but the length thereof will not in any way lessen the quality of the flame, its heating properties being in all cases equal, and variable only by lifting the bridge block 41 and allowing more flame through the tunnel 49ᵇ.

The fire bars 16 are formed with the flats 16ᵃ under the hearth, slots 16ᵇ between each lug 16ᶜ being for the purpose of allowing a small amount of air to play on the fuel from underneath and assist in combustion.

In carrying the invention into practical effect, the fuel is passed into the hopper 49ᶜ to later settle upon the fire bars 16.

The fuel may be graded before use if desired but it is not necessary as the hopper may be filled to a convenient height and as the fuel is burnt the uppermost pieces will settle down to supply the necessary heating.

When the fire is started and the fire bars 16 are sufficiently heated, the water service is then brought into play, water passing along the pipe line 12 and through nozzles 15 into the fire bars 16.

The fire bars being hot, the water sprayed therein is turned into gas, and this gas may be returned into the furnace for accelerating the heating and assisting combustion of the solid fuel.

A large or small percentage of this gas may be returned to furnace by operating the shutter 29 pivotally mounted to the arm 30 which either closes or opens the passage into the gas tunnel 26, or any desired quantity can be used direct for other industrial purposes.

The flame from the fuel is then directed through the opening caused by the raising or lowering of the bridge block 41 together with the fire brick or plumbago lip 42 so that the flame may be adjusted regarding its density and delivered to the predetermined position under or to the boiler.

Should the fire require a natural draught in order to promote greater heat within the fire box the damper 23 may be regulated accordingly so that the draught is directed along the tunnel 26 and mixing with the gases already in the tunnel is eventually delivered to the fire box.

The guiding path of fire brick is provided with a mica window or spy hole 49ᵉ for inspection of the flame as it leaves the opening 56.

The term gas has been used to denote the product resulting from the water, or water and air, sprayed into tubes 16.

I desire it to be understood that the apparatus will operate without the use of water, but with the addition of the water the heating effect is considerably augmented, and by causing the water supply pipe 12 to be brought against the front plate 1 and the nozzles 15 placed within the mouths of the hollow fire bars, a gas is obtained which may be withdrawn from the tunnel for any purpose wherein such gas is desirable, and it will be readily understood that the filtered water only should be used, so as to prevent clogging of the water nozzles.

Thus I have described a smoke consumer and fuel economizer and means combined therewith for controlling and drawing off gas which by virtue of being an external unit entirely eliminates necessity for altering existing constructions appertaining to boilers and smoke stacks, the fuel consumption being abnormally low while the heat effect obtained from a minimum of fuel, is of such an intense nature that almost any metal or alloy can be fused thereby.

I claim:

1. An apparatus for generating power, comprising, a fire box, a flame tunnel leading from the fire box to a boiler, and means for adjusting the flow section of the tunnel, said means including a vertically adjustable bridge block, the bottom of the block forming the entire top contact portion of said flame channel.

2. An apparatus of the class described, comprising, a fire box, a flame tunnel leading from the fire box, an adjustable fire bridge at the rear of the fire box, the bottom of the bridge forming the entire top contact portion of the flame tunnel, and means for raising and lowering the bridge including a shaft, pinions on the shaft, a rack on the bridge meshing with said pinions, and an arm for operating the shaft.

3. An apparatus of the kind described, comprising a fire box, a shaft pivotally mounted at the top of the same, a metal flap secured to the shaft, a right angle lip secured to the lower end of the metal flap, a plate supported within the fire box, said lip coacting with the plate, whereby to prevent draught from entering the fire box while adjusting the flap by means of said shaft.

Signed at Melbourne, Victoria, Australia, this 6th day of September 1922.

JOSHUA GOODALL NAYLOR.